(12) United States Patent
Story

(10) Patent No.: US 10,740,703 B2
(45) Date of Patent: Aug. 11, 2020

(54) METHOD AND SYSTEM FOR DETERMINING OPTIMIZED TRAVEL PATH FOR AGRICULTURAL IMPLEMENT ON LAND WITH OBSTACLE

(71) Applicant: VERGE TECHNOLOGIES INC., Saskatoon (CA)

(72) Inventor: Lane Story, Saskatoon (CA)

(73) Assignee: VERGE TECHNOLOGIES INC., Saskatoon (CA)

( * ) Notice: Subject to any disclaimer, the term of this patent is extended or adjusted under 35 U.S.C. 154(b) by 81 days.

(21) Appl. No.: 15/905,143

(22) Filed: Feb. 26, 2018

(65) Prior Publication Data

US 2018/0189689 A1    Jul. 5, 2018

Related U.S. Application Data

(63) Continuation-in-part of application No. 14/264,818, filed on Apr. 29, 2014, now Pat. No. 9,933,787.

(60) Provisional application No. 61/818,760, filed on May 2, 2013.

(30) Foreign Application Priority Data

Apr. 29, 2013   (CA) ..................... 2814599

(51) Int. Cl.
*G06Q 10/04* (2012.01)
*G06Q 50/02* (2012.01)

(52) U.S. Cl.
CPC ........... *G06Q 10/047* (2013.01); *G06Q 50/02* (2013.01)

(58) Field of Classification Search
None
See application file for complete search history.

(56) References Cited

U.S. PATENT DOCUMENTS

| 6,934,615 | B2* | 8/2005 | Flann | ................ | A01B 69/008 |
| | | | | | 172/2 |
| 2008/0103690 | A1* | 5/2008 | Dix | ................ | G05D 1/0278 |
| | | | | | 701/516 |
| 2008/0103694 | A1* | 5/2008 | Dix | ................ | A01B 69/008 |
| | | | | | 701/425 |
| 2010/0063735 | A1* | 3/2010 | Kindo | ................ | B60W 40/072 |
| | | | | | 701/300 |
| 2011/0153136 | A1* | 6/2011 | Anderson | ............ | G05D 1/0219 |
| | | | | | 701/25 |

* cited by examiner

*Primary Examiner* — Thomas G Black
*Assistant Examiner* — Ana D Thomas
(74) *Attorney, Agent, or Firm* — King & Schickli, PLLC

(57) ABSTRACT

Methods for identifying and addressing inefficiencies in agricultural production activities caused by physical obstacles in the target field. A method and system is disclosed for determining an optimized travel path for an agricultural implement, specifically in the presence of an obstacle or obstruction such as an access road, oil well or public utility infrastructure. The method may further comprise means for determining the impact of such obstacle or obstruction on production from the agricultural land, as well as means for determining an optimized implement type and configuration. One or more travel path plans may be generated for selection of one by an agricultural producer. The method may also comprise means for determining an optimized location or position within a plot of land for an obstacle or obstruction that has not yet been constructed, as a way to reduce or alleviate the negative impact of such obstacle or obstruction on production from the plot of land.

20 Claims, 8 Drawing Sheets

METHOD AND SYSTEM FOR DETERMINING OPTIMIZED TRAVEL PATH FOR AGRICULTURAL IMPLEMENT ON LAND WITH OBSTACLE

FIELD OF THE INVENTION

The present invention relates to methods of agricultural production, and specifically to methods for enhancing production through determination of optimized work plans.

BACKGROUND OF THE INVENTION

Agricultural activity such as seeding or harvesting is commonly undertaken using selected implements and driving or pulling such implements across the land in a sequence of generally parallel rows, with only modest overlap dictated primarily by the implement itself. It is obvious that the most optimized and beneficial situation is one in which the land can be farmed in a series of straight, uninterrupted rows, back and forth from one end of the field to the other as one works across the field. No wasted implement movement is necessary, and no energy or time is therefore wasted.

However, it is well known in the art of production from agricultural land that physical obstacles and obstructions are common and that the presence of such can negatively impact production activities. For example, natural obstacles such as water bodies can block a farmer's ability to move the selected implement in straight, uninterrupted rows, instead forcing the farmer to redirect the implement around the obstacle and thereby introduce inefficiencies and potential waste of time and energy resources, such as due to going over the same patch of land two or more times as you work around the obstacle from different angles. It can be challenging to determine a travel path for the selected implement that covers the land as efficiently as possible so as to reduce resource waste.

In addition, man-made obstacles are increasingly making an impact on agricultural production. Hydrocarbon production and pipeline facilities, power and communication utility infrastructure, and various other constructed obstacles and obstructions obviously impact the ability to produce from the land that is being taken up, but with the added presence of access roads, berms and the like there is a heightened impact on the ability to efficiently farm the remaining land, and the negative production impact is not limited to simply the exact patch of land that has been removed from agricultural use. As is the case with natural obstacles, redundant implement travel can result from the irregular remaining land that must be acted upon, with the resultant resource waste.

While producers may attempt, with varying degrees of success, to determine an optimized way to farm the remaining land in the now-disturbed field, it is a challenging task that commonly results in a less-than-optimal approach. The results are often unsatisfactory, and efforts to compensate farmers for lost production are hampered by uncertainty around the quantum of loss.

What is needed is a method for assessing the impact of an obstacle on agricultural activities and determining a way to optimize production.

SUMMARY OF THE INVENTION

The present invention is accordingly primarily directed to a method for optimizing the travel path of an agricultural implement, such that a producer can attempt to reduce the inefficiencies arising from an in-field obstacle or obstruction, although other means of optimizing the workflow are disclosed herein.

According to a first aspect of the present invention, then, there is provided a computer implemented method for controlling an agricultural implement in an agricultural field, the method comprising:

identifying dimensions of an external boundary of the agricultural field, the external boundary of the agricultural field defining an agricultural field area;

calculating dimensions of a boundary extent of an obstacle within the external boundary of the agricultural field and a location of the obstacle in the agricultural field, the boundary extent of the obstacle defining an obstacle area;

determining a total area of the agricultural field outside the boundary extent of the obstacle that is available for an agricultural activity by subtracting the obstacle area from the agricultural field area;

selecting an agricultural implement suitable for the agricultural activity, the agricultural implement having operating parameters;

determining potential travel paths for the agricultural implement to traverse the entirety of the total area under the operating parameters;

selecting an optimized travel path of the potential travel paths based on one or more predetermined factors; and outputting instructions for controlling the agricultural implement based on the optimized travel path.

In some exemplary embodiments of the first aspect, the step of identifying dimensions of the external boundary of the agricultural field comprises accessing a record of pre-measured dimensions for the agricultural field. The step of calculating dimensions of the boundary extent of the obstacle may comprise accessing a record of pre-measured dimensions for the agricultural field. The step of determining the potential travel paths preferably includes simulating each potential travel path.

The operating parameters of the agricultural implement may include a travel path width for the agricultural implement, which may further include an anticipated overlap for adjacent rows of a potential travel path. Each path of the potential travel paths preferably comprises a distance, and the one or more predetermined factors are based on the distance. The one or more predetermined factors may include a travel time, or a crop input, and the instructions are preferably electronic instructions suitable for use in a navigational system for the agricultural implement.

According to a second aspect of the present invention, there is provided a computer implemented method for controlling an agricultural implement in an agricultural field, the method comprising: identifying dimensions of an external boundary of the agricultural field, the external boundary of the agricultural field defining an agricultural field area;

calculating dimensions of a boundary extent of an obstacle within the external boundary of the agricultural field and a location of the obstacle in the agricultural field, the boundary extent of the obstacle defining an obstacle area;

determining a total area of the agricultural field outside the boundary extent of the obstacle that is available for an agricultural activity by subtracting the obstacle area from the agricultural field area;

selecting an agricultural implement suitable for the agricultural activity, the agricultural implement having operating parameters;

determining potential travel paths for the agricultural implement to traverse the entirety of the total area under the operating parameters;

selecting an optimized travel path of the potential travel paths based on one or more predetermined factors; and generating a travel plan for the optimized travel path.

In some exemplary embodiments of the second aspect, the travel plan comprises at least one of a map and instructions for controlling the agricultural implement, and in some embodiments the instructions are electronic instructions suitable for use in a navigational system for the agricultural implement.

The step of determining potential travel paths preferably comprises: determining a first travel path for the agricultural implement to traverse the entirety of the total area under the operating parameters; and determining at least one second travel path for the agricultural implement to traverse the entirety of the total area under the operating parameters.

In some exemplary embodiments, selecting the agricultural implement comprises selecting a first agricultural implement having first operating parameters and a second agricultural implement having second operating parameters, and determining potential travel paths comprises determining first potential travel paths for the first agricultural implement to traverse the entirety of the total area under the first operating parameters, and determining second potential travel paths for the second agricultural implement to traverse the entirety of the total area under the second operating parameters.

The step of selecting the optimized travel path may comprise: selecting a first optimized travel path of the first potential travel paths based on one or more predetermined factors; selecting a second optimized travel path of the second potential travel paths based on the one or more predetermined factors; and selecting one of the first agricultural implement or the second agricultural implement based on a comparison of the first optimized travel path and the second optimized travel path.

According to a third aspect of the present invention, there is provided a computer implemented method for controlling an agricultural implement in an agricultural field, the method comprising:

identifying dimensions of an external boundary of the agricultural field, the external boundary of the agricultural field defining an agricultural field area;

calculating dimensions of a boundary extent of an obstacle within the external boundary of the agricultural field and a location of the obstacle in the agricultural field, the boundary extent of the obstacle defining an obstacle area;

determining a total area of the agricultural field outside the boundary extent of the obstacle that is available for an agricultural activity by subtracting the obstacle area from the agricultural field area;

selecting an agricultural implement suitable for the agricultural activity on the agricultural field, the agricultural implement having operating parameters;

determining at least two potential travel paths for the agricultural implement to traverse the entirety of the total area under the operating parameters; and generating a comparison of the at least two potential travel paths based on one or more predetermined factors.

In some exemplary embodiments of the third aspect, the method further comprises determining an impact of the obstacle on the agricultural activity based on the comparison of the at least two travel paths. The step of determining the impact preferably comprises: defining a pre-disturbance area based on the dimensions of the agricultural field; determining a first travel path for the agricultural implement to traverse the pre-disturbance area under the operating parameters; defining a disturbance area based on the obstacle area and the location of the obstacle in the agricultural field; determining a second travel path for the agricultural implement to traverse the post-disturbance area under the operating parameters; and comparing the first and second possible travel paths. Exemplary methods may further comprise selecting a crop and determining the agricultural activity based on the selected crop.

The present invention is directed to selecting one of a plurality of possible travel paths, each of which provides a path to cover the same field, based on a comparison using set predetermined criteria or parameters. The selected or "optimized" travel path, however, could be determined based on various parameters. As one example, comparing possible travel paths to determine which would have the shorter distance is one non-exhaustive way to establish an optimized travel path, where distance is determined to represent fuel consumption and/or exhaust emissions and thus an optimized travel path would be one having reduced fuel consumption and/or exhaust emissions. However, other parameters or criteria could be employed when comparing the possible travel paths. For example, time may be the target criteria, and specifically reducing the time spent on the path—even where the quickest route may actually embody a slightly longer path than an alternative path. Operational costs or raw material costs provide yet another example, where shortest distance may not equate to reduced costs. Optimization could be directed to reducing soil erosion, compaction or top soil pulverization (looking, for example, to land use, slope position, and soil organic and inorganic variables), or reducing negative water quality impact (such as by adding buffer zones—slopes, soils, etc.—to define "buffer obstacles").

Optimization according to embodiments of the present invention could further be directed to enhancing yield alone, or a combination of yield and distance/time. For example, if yield could be optimized by reducing time, spending the same time (not reducing time) could generate increased yield. Embodiments of the present invention could further be utilized to identify the most effective travel path to maximize harvested production quality, or a combination of harvested quality and optimized distance travelled or time expended. Land slope could also be taken into account in determining an optimized travel path. In addition, embodiments of the present invention could be used for determining and identifying obstructions that are currently farmed but could or should be farmed independently due to slope, soil texture, or soil chemistry (for example, taking into account terraces, soil erosion, low/high, position to the sun, etc.).

In addition to optimized travel across an entire field, embodiments of the present invention may be used to optimized overlap of adjacent rows, which can be useful in reducing input costs, for example seed, fertilizer and chemical additives. Further, embodiments according to the present invention could be used to assess the effects of field boundary increases and decreases, thus providing another means to provide an optimized travel path.

Historical field coverage maps can also be utilized through computer processing in certain embodiments, to determine baseline travel performance as well as to provide historical time and location data. Historical equipment/implement travel patterns can further be assessed from aerial and satellite images.

Optimization of work flow in agricultural production may thus include reducing distance travelled. The reduction in distance travelled through planning and computer simulation can reduce the time required for the selected field activity. Additional effects of such optimization may include improved workflow for multiple implements/units used in an agricultural field while reducing total distance travelled and time required. While the distance travelled may be optimized through computer simulation and field planning prior to entry, time may also be reduced when multiple pieces of equipment are utilizing the reduced distance and operation is coordinated.

Reducing distance travelled in an agricultural field may also employ the computer simulation of possible equipment entry and exit points while the optimized plan is simulated with a minimum of two possibilities while considering and analyzing multiple scenarios.

Agricultural production and equipment support require planning and analysis of crop input load and unload travel patterns and locations. Although the primary agricultural equipment is provided with an optimized field plan in some exemplary embodiments of the present invention, the support equipment suppling seed, fertilizer, pesticides and/or removing the agricultural product may also benefit from field management, planning and optimization to reduce distance travelled and time expended. Positioning and determination of load and unload areas for support equipment for inputs and harvest removal should also be optimized where appropriate, including field entry and exit optimization (optimized path calculating possible entry and exit points start to finish per field) and field to field optimization (optimized path calculating possible field to field entry and exit points).

Also, it should be noted that embodiments of the present invention may be capable of implementation in autonomous vehicles. Agricultural technology is advancing into the areas of autonomous implements, robotics and aerial-deployed implements. Agricultural activity is not limited to seeding and harvest. Although seeding and harvest are critical agricultural activities to grow a crop, many activities are required to produce a crop, including but not limited to: grain cart load/unload, planter load/unload, pesticide and fertilizer load/unload, spraying, harrowing, tilling, floating, rock picking, land rolling, land leveling, and others. Conventional agricultural equipment historically is pulled with a power unit or is self-propelled, but the future of agricultural implements will likely include aerial application or robotics that will be land and air based to complete agricultural activity to produce a crop. Optimization pursuant to the present invention may therefore be applied to activities such as optimizing the size of the implement and coverage area.

In addition, travel plan optimization according to embodiments of the present invention may also reduce personal stresses arising from field and farm management, which optimization may then be seen as enhancing productivity and safety.

A detailed description of exemplary embodiments of the present invention is given in the following. It is to be understood, however, that the invention is not to be construed as being limited to these embodiments.

BRIEF DESCRIPTION OF THE DRAWINGS

In the accompanying drawings, which illustrate exemplary embodiments of the present invention.

Exemplary embodiments of the present invention will now be described with reference to the accompanying drawings.

DETAILED DESCRIPTION OF EXEMPLARY EMBODIMENTS

The present invention is directed to methods for identifying and addressing the impact on agricultural production of a physical obstacle—natural or man-made—that is located in a field. Reference is made to pre-disturbance and post-disturbance land areas, which respectively represent the farmable land before and after introduction of the obstacle. In the case of a man-made obstacle, the method may address a situation where the obstacle is already in place, or it may address a situation where the obstacle has yet to be positioned in the field. As stated above, a travel path may be selected as "optimized" based on various criteria and parameters, depending on what the operator has determined is the factor to be determinative in selecting between possible paths. One common feature of the exemplary methods described below is the determination of a post-disturbance farmable area, and how one can optimize production by analysis of that farmable area and determination of an implement travel path having the shortest distance and therefore a reduced impact on production.

Four such exemplary methods are described herein to illustrate certain modes of the present invention.

Determining an Optimized Travel Path for an Agricultural Implement

Figure 1:
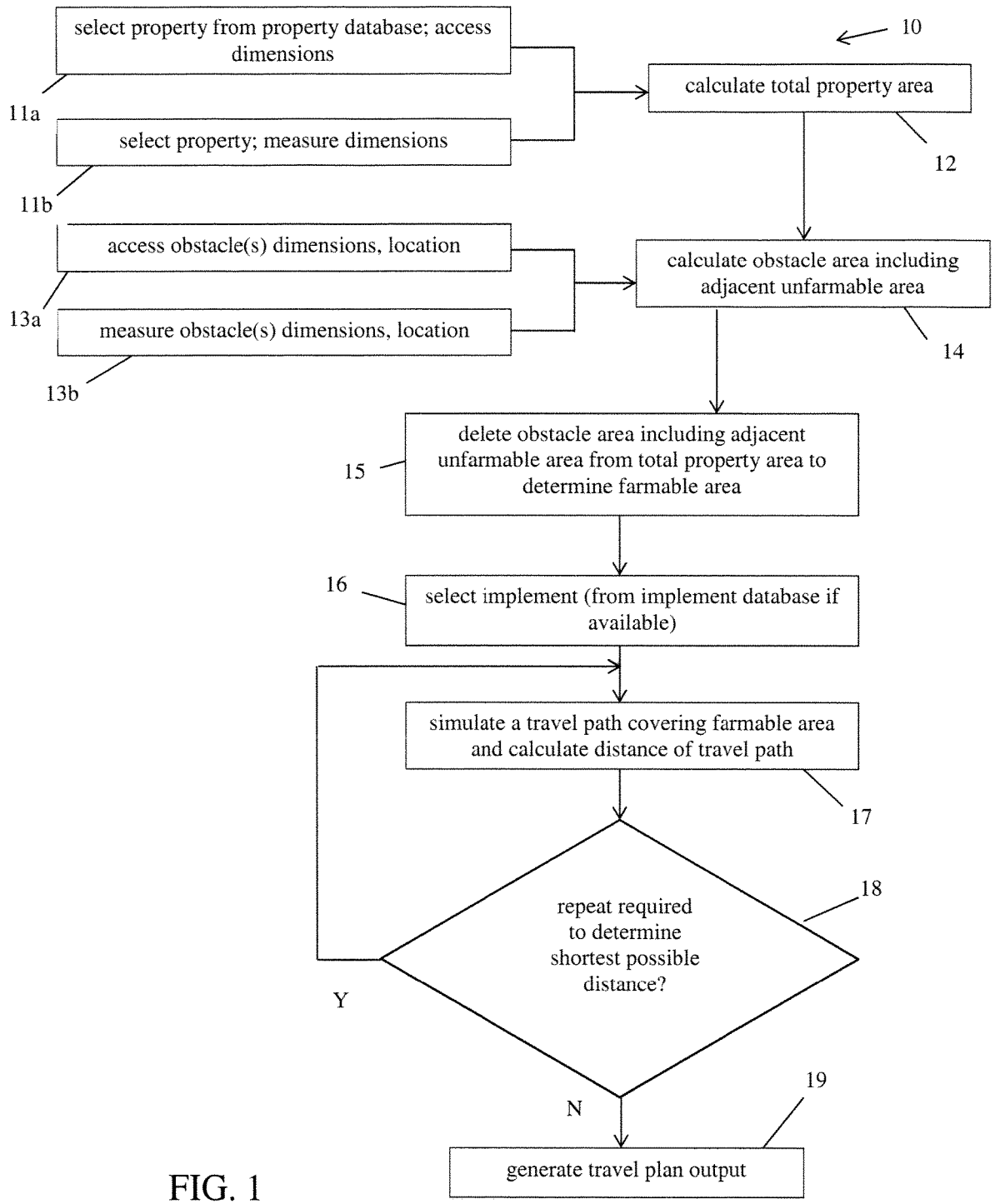
FIG. 1 is a flowchart illustrating a first method in accordance with the present invention.

Turning to FIG. 1, a method 10 is disclosed for determining an optimized travel path for a selected agricultural implement on post-disturbance land. The method 10 begins with selection of a target property at step 11a or 11b; step 11b is where the property information including field dimensions is located in a database, and step 11b is where the property information must be measured by the producer. Once the dimensions have been located or acquired, the total property area is calculated at step 12. Next, the producer either accesses (step 13a) or measures (step 13b) the dimensions of the particular obstacle under consideration and its location within the total property area, and thus calculates the area of the obstacle itself at step 14. Note that an obstacle may create unfarmable land adjacent its margins depending on its position within the total property area, and step 14 includes determination of this additional unfarmable area, as well.

Once the total property area and obstacle area have been calculated, which calculation can be undertaken manually or by a suitable software program (as would be known to those skilled in the art), the obstacle area is deleted from the total property area at step 15 to produce a representation of a farmable area portion of the total property area; this is the land that can actually be farmed in the presence of the obstacle (whether that obstacle is currently present or is still under planning or construction).

At step 16, an implement is selected that is suitable for farming the farmable area. As will be clear to those skilled in the art, different types and sizes of implements will be appropriate for different proposed agricultural activities on the land, and different sizes (and particularly widths) of implements will have an impact on optimization of the travel path in the presence of the obstacle. The implement information can be stored in a database and accessed via appropriate software, or it can be manually accessed.

Once a suitable implement has been selected, the method proceeds at step 17 with simulation of a travel path for the selected implement, the travel path selected such that it covers the entire farmable land to the extent possible with the selected implement in the presence of the obstacle. As the goal of the method 10 is to optimize the production in the presence of the obstacle, determining a travel path having the shortest distance—and therefore the most optimized solution based on factors such as use of time, crop inputs and the like—is the desired end.

It is within the skill of programmers to create software comprising an algorithm allowing determination of a shortest possible route to cover a specific area. It is believed that such software could be easily modified to allow simulation testing to determine a shortest possible travel path given the farmable area, size and location of the obstacle, and size of the implement. However, the above method including simulations can be practiced manually, and both manual and software-derived simulation activities are intended to be included within the scope of the present invention.

Figure 2A:
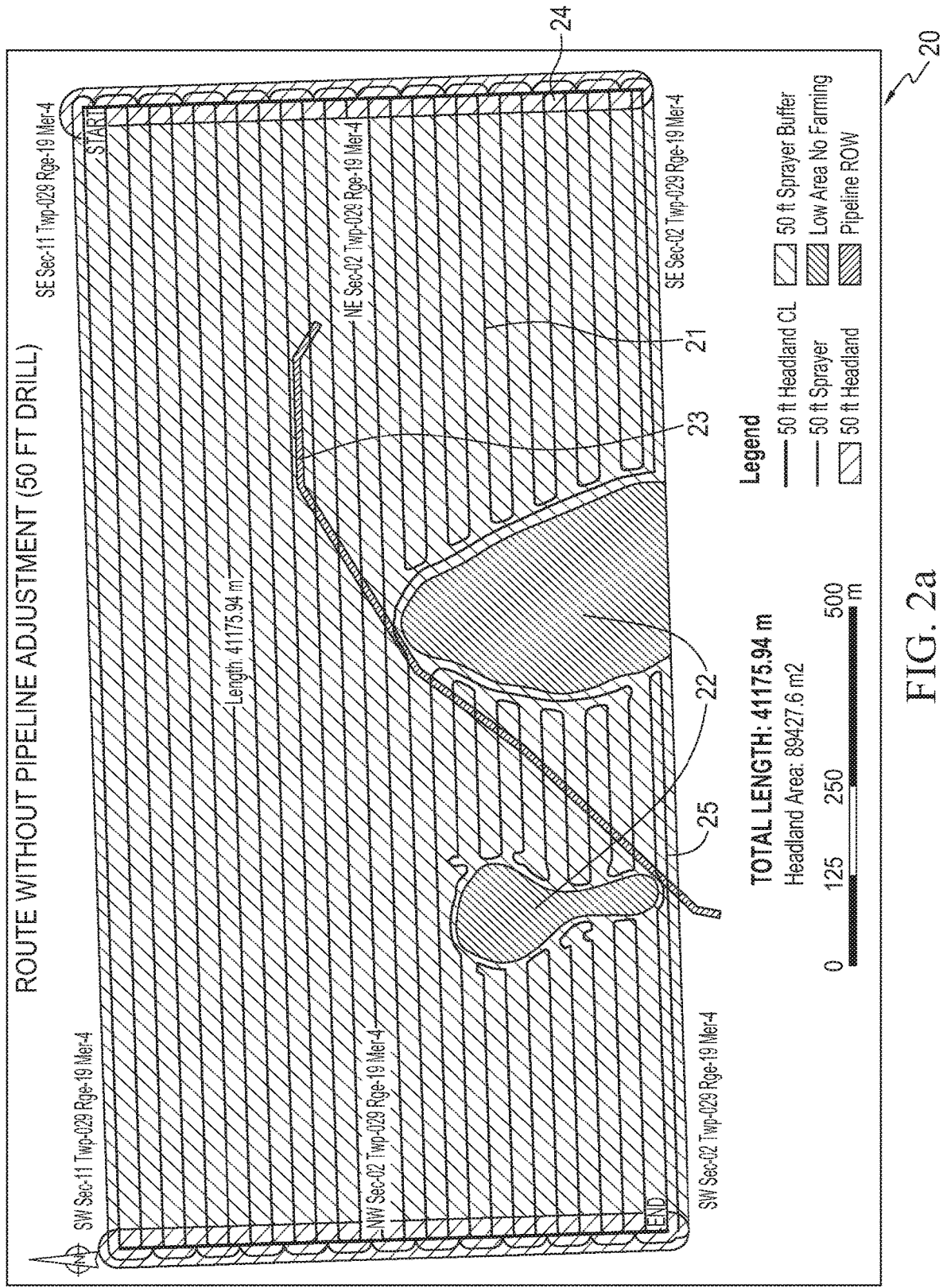
FIG. 2a is a sample map illustrating a pre-disturbance travel path.
Figure 2B:
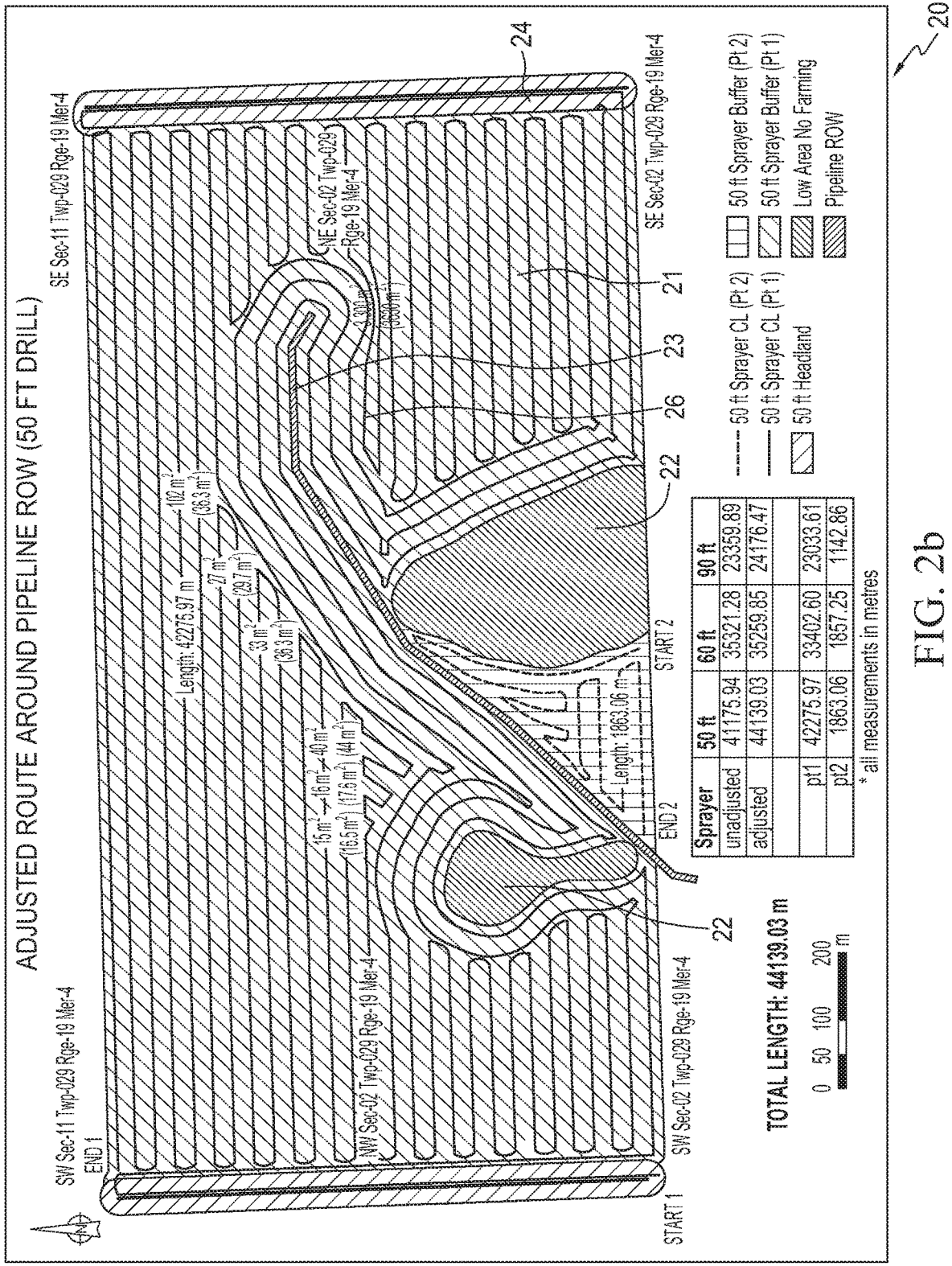
FIG. 2b is a sample map illustrating a post-disturbance travel path.

In the event that multiple simulations may be required in order to determine a shortest travel path distance, step 18 allows for a looping back to allow further simulations with alternate travel paths. Such looping may be part of both manual and software-driven simulation activities. At a certain stage, either after a pre-determined number of simulations or once a threshold travel distance is achieved, a travel path is selected and a travel plan output is generated at step 19. The travel plan output may be a hard-copy map for use by a farmer, or it may be a set of electronic instructions suitable for use in navigational systems found in certain conventional implements. The goal is to provide a map or set of instructions that the farmer can use in optimizing production activities on the post-disturbance land. An example of a map showing an optimized travel path is shown in FIG. 2b, which is described in detail below.

Figure 3A:
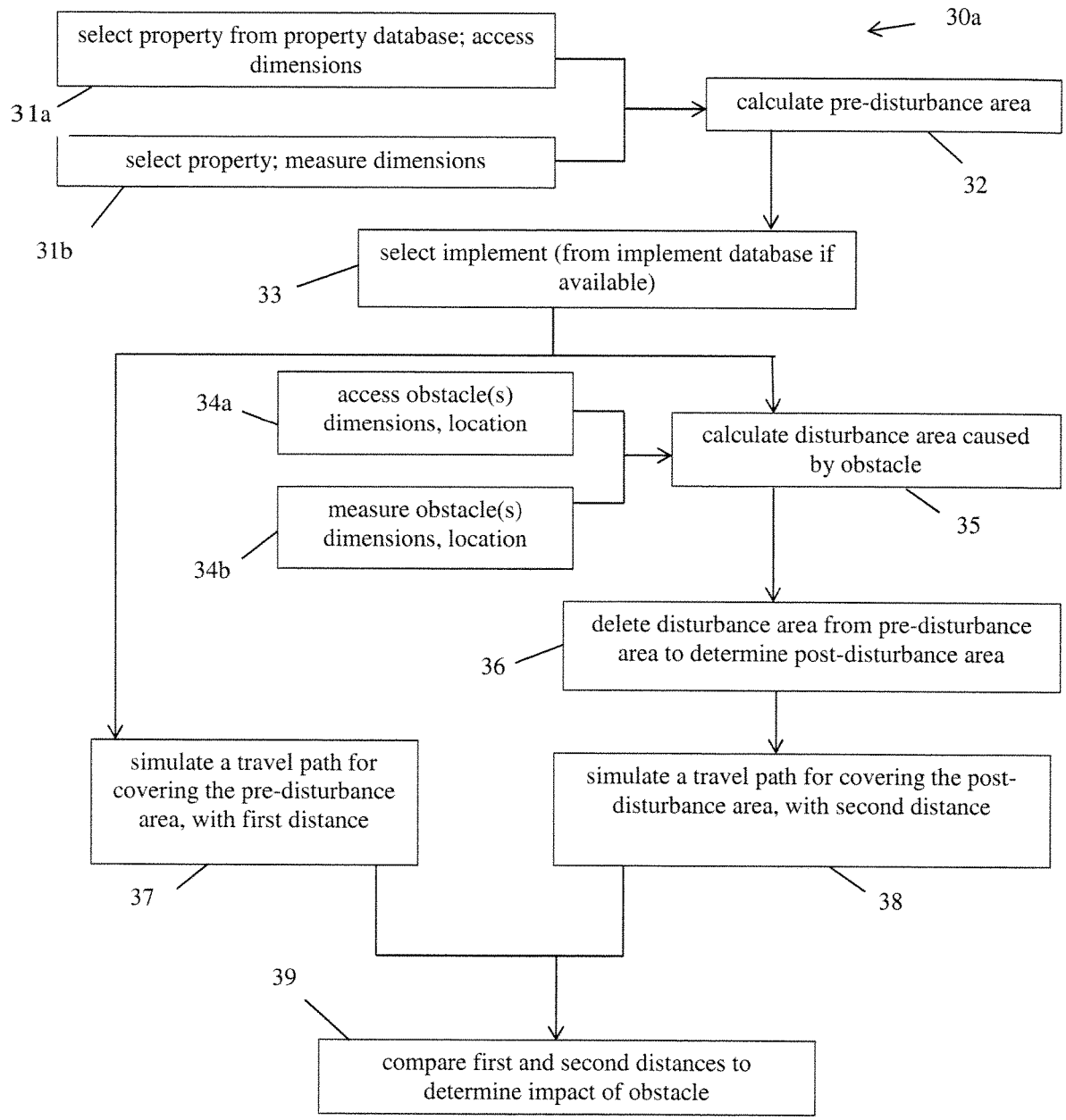
FIG. 3a is a flowchart illustrating a second method in accordance with the present invention.
Figure 3B:
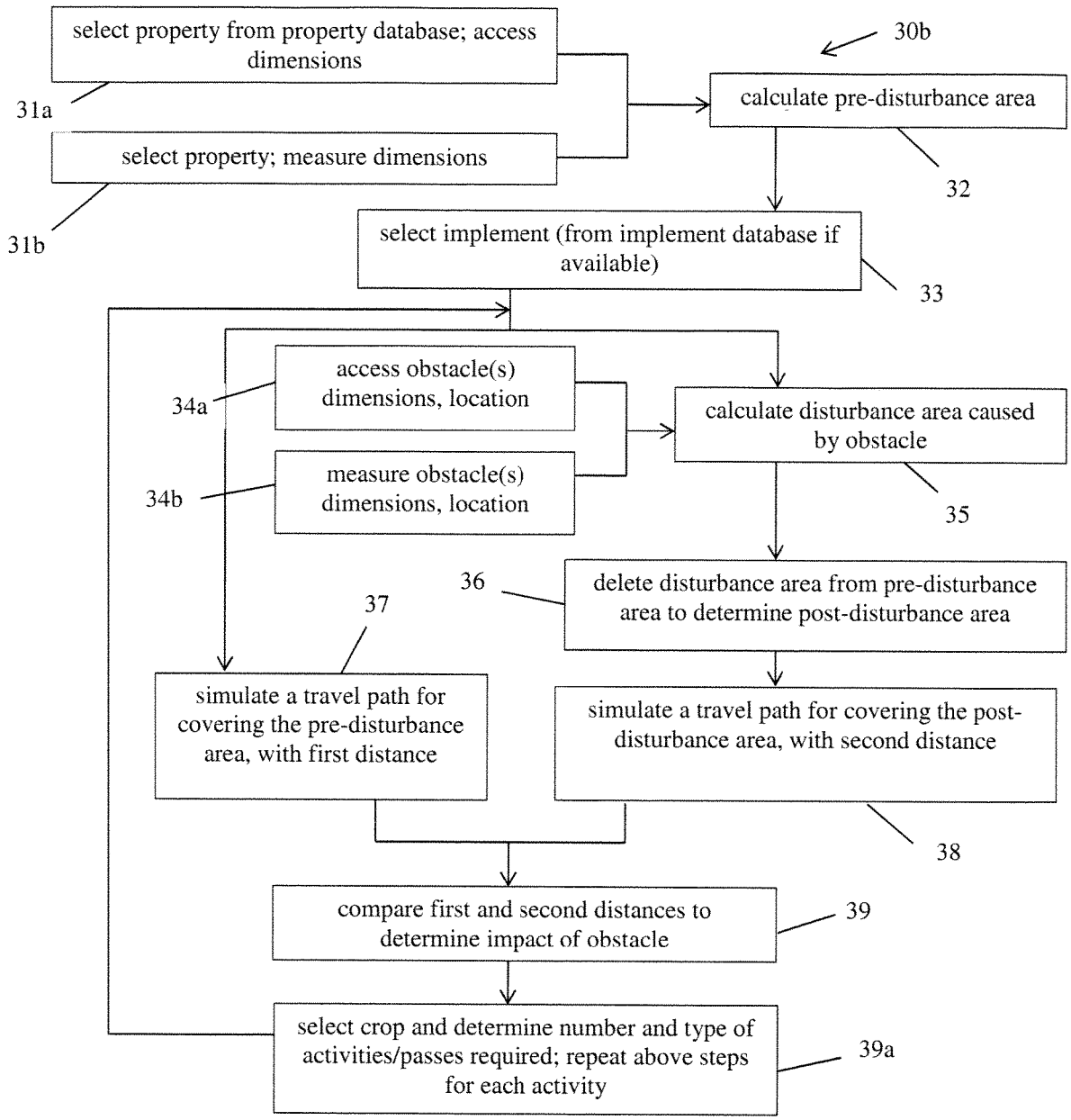
FIG. 3b is a flowchart illustrating a first modified form of the second method in accordance with the present invention.
Figure 3C:
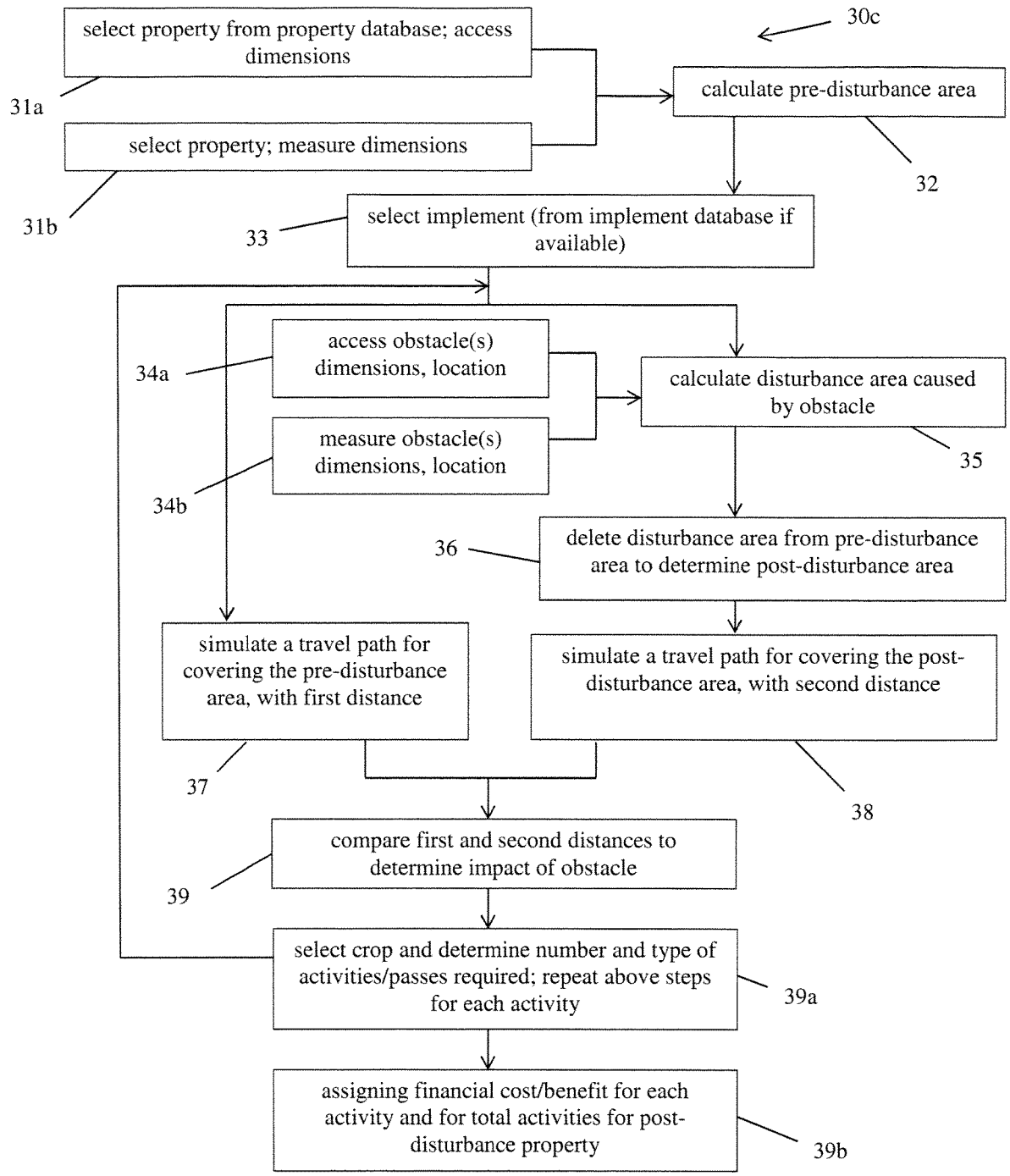
FIG. 3c is a flowchart illustrating a second modified form of the second method in accordance with the present invention.

Determining Impact of a Physical Obstacle on Agricultural Production from a Plot of Land While the above method focused on determining how to optimize the use of a selected implement on post-disturbance land, and specifically how to reduce the travel distance and therefore optimize production, FIGS. 3a, 3b and 3c illustrate related methods for determining the impact of the obstacle itself on production capabilities.

Referring now to FIG. 3a, a method 30a is illustrated which uses travel path simulations on pre-disturbance and post-disturbance land to enable a comparison of the travel paths as a means to assess obstacle impact on agricultural production. As with the above method 10, the method 30a begins with property selection (either from a database at step 31a or through direct measurement at step 31b) from which one can calculate a pre-disturbance area at step 32.

At step 33, an implement is selected in a similar way as described above with respect to method 10. Once the implement is selected, the method 30a bifurcates into two parallel simulation activities. First, a simulation activity is undertaken at step 37 which determines a travel path and related travel distance for the pre-disturbance area calculated at step 32. An example of such a travel path is illustrated in FIG. 2a. FIG. 2a illustrates an exemplary map or plan 20, which shows the property 21 under consideration and certain natural obstacles 22 present on the property 21. (Note that this plan 20 ignores the presence of the proposed pipeline right-of-way 23.) Based on the dimensions of the property 21, the size and position of the natural obstacles 22, and presence of headlands 24, a pre-disturbance travel path 25 is created (in the case of the illustrated example, by a software application). As can be seen, the travel distance for this example has been determined to be 41175.94 m, the distance that would be travelled by the selected implement in the absence of the man-made obstacle (the proposed pipeline right-of-way 23).

Second, another simulation activity is undertaken with consideration now given to the proposed man-made obstacle. The dimensions and proposed location of the man-made obstacle are acquired or located (by accessing a database at step 34a or by direct measurement at step 34b), such that a disturbance area caused by the obstacle can be calculated at step 35. After deleting this disturbance area from the pre-disturbance area to arrive at a post-disturbance area suitable for simulating agricultural activities at step 36, a second simulation activity takes place at step 38. This second simulation activity determines a travel path in the presence of the man-made obstacle, in this case the pipeline right-of-way 23. Turning to FIG. 2b, a plan 20 is illustrated showing a post-disturbance travel path and distance, which travel path works around the presence of the pipeline right-of-way 23. As can be seen on FIG. 2b, the travel distance for the implement is now 42275.97 m, an increase of approximately 1100 m. This increase would be noted at step 39 when the travel distances of the two simulations are compared, as would the fact that an increased travel distance—which will equate to increased input costs for production—is also required to farm a smaller productive land area, thereby providing quantifiable information regarding the impact of the obstacle on agricultural production from the selected property. Other impacts from the increased travel path, such as for example, increased land compaction from passage of the implement through increased overlaps, may also be noted as part of the impact.

While the above illustrates how the impact of an obstacle can be determined, it should be noted that an object of the present invention is to optimize agricultural activity in the presence of one or more obstacles, thereby attempting to mitigate inefficiencies and other undesirable results. For example, identifying a shortest possible travel path can help to reduce the volume of crop inputs that would otherwise be required to work around an obstacle, such crop inputs including fertilizers, pesticides, herbicides, insecticides and fungicides. This reduction in crop input volume would obviously have an economic impact on the agricultural operation, but it can also have a significant impact on environmental loading of the property. As is known to those skilled in the art, a field can be overloaded with crop inputs to the point of toxicity, and methods in accordance with the present invention can help to reduce the environmental load on the field.

Turning now to FIG. 3b, an additional factor is introduced in a modified method 30b for determining obstacle impact on agricultural production. As in well-known to those skilled in the art, a field is subjected to more than one agricultural activity. For example, a field may be subject in a single season to harrowing, seeding, spraying, swathing, combining and harvesting. To reflect this reality, FIG. 3b adds step 39a of selecting a particular crop to be grown on the field and determining the number and type of activities that will be required on the land for that type of crop. The method 30b then includes a looping of the simulation activities for each agricultural activity proposed for the selected crop. If, for example, three activities are anticipated during the growing season, the obstacle impact could essentially be tripled.

The fact that there is an impact on agricultural production will obviously have a financial or economic cost, and not simply from loss of certain previously farmable land. Where the travel distance is increased to address the presence of a man-made obstacle, there will be increases in input costs such as seed or fertilizer as well as implement fuel and labour costs. Turning to FIG. 3c, step 39b is undertaken to assign a financial cost/benefit for each activity and a total value for the post-disturbance property. This analysis may be of use in negotiating compensation for landowners in respect of loss of farmable land.

Determining an Optimized Agricultural Implement for Use on a Plot of Land

Figure 4:
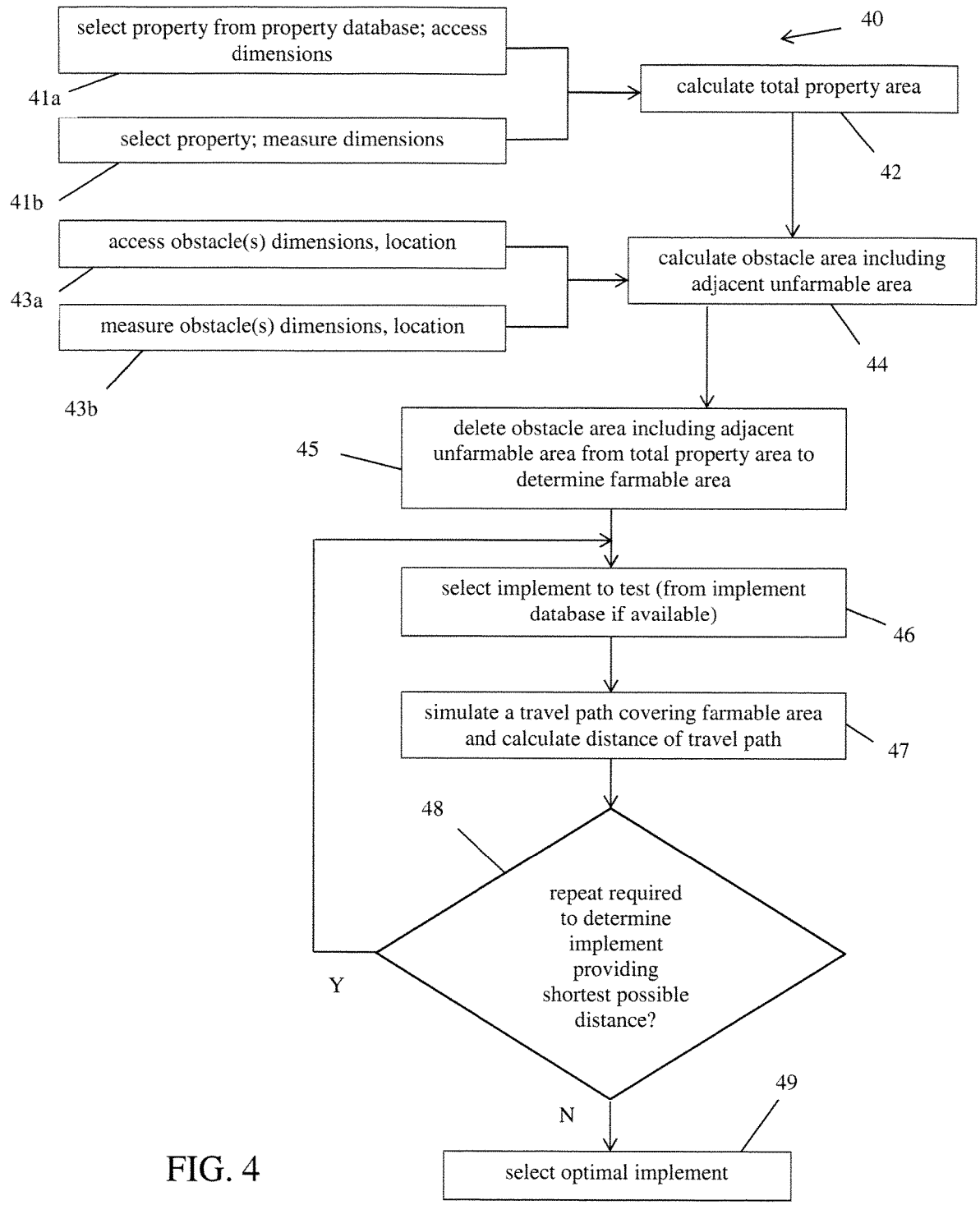
FIG. 4 is a flowchart illustrating a third method in accordance with the present invention.

While different travel paths can have an effect on obstacle impact on production from a target field, the size and type of implement employed can also have an effect. For example, a wider implement may normally be able to cover a field in fewer passes, but the size, irregularity and precise location of a man-made obstacle with respect to property boundaries or natural obstacles may generate inefficiencies with wider implements. Turning now to FIG. 4, a method 40 according to the present invention is directed to determining an optimized implement size and type for use in agricultural production for a target property comprising one or more physical obstacles. The method 40 begins with acquiring or locating information regarding the target property (dimension information, obtained at step 41a by accessing a database or through direct measurement at step 41b) and the obstacle or obstacles (dimension and location, again obtained through either database access at step 43a or measurement at step 43b). The total property area can be calculated at step 42 using the property information, and the obstacle area can be calculated at step 44 using the obstacle information. The farmable land subject of simulations is then determined by deleting the obstacle area from the total property area at step 45.

At step 46, a specific implement is selected for the simulation exercise. If a database is maintained with appropriate implement information, this can be accessed; otherwise, a manual selection is possible within the scope of the method 40. Once the implement is selected, a simulation can be run at step 47 in accordance with the within teaching to create a travel path covering the farmable area to the extent possible, and a calculation of the travel distance can then be undertaken.

A plurality of simulations can be run at step 48 to determine which implement provides the shortest travel distance in the presence of the obstacle(s), and at step 49 the implement with the shortest travel distance is selected as the optimal choice. It will be obvious to those skilled in the art that factors other than travel distance may require consideration and even be determinative in certain contexts, but this method 40 can be employed where a producer wishes to reduce input costs particularly in light of the loss of some otherwise productive farm land.

Determining an Optimized Position Within an Agricultural Plot of Land for an Obstacle In each of the previous methods in accordance with the present invention, the location of the man-made obstacle was either known or had been planned but construction/installation had not yet been executed. The present invention also provides means for optimizing the position of such an obstacle on a target field, which can be useful for landowners when negotiating placement of an obstacle on their land.

Figure 5:
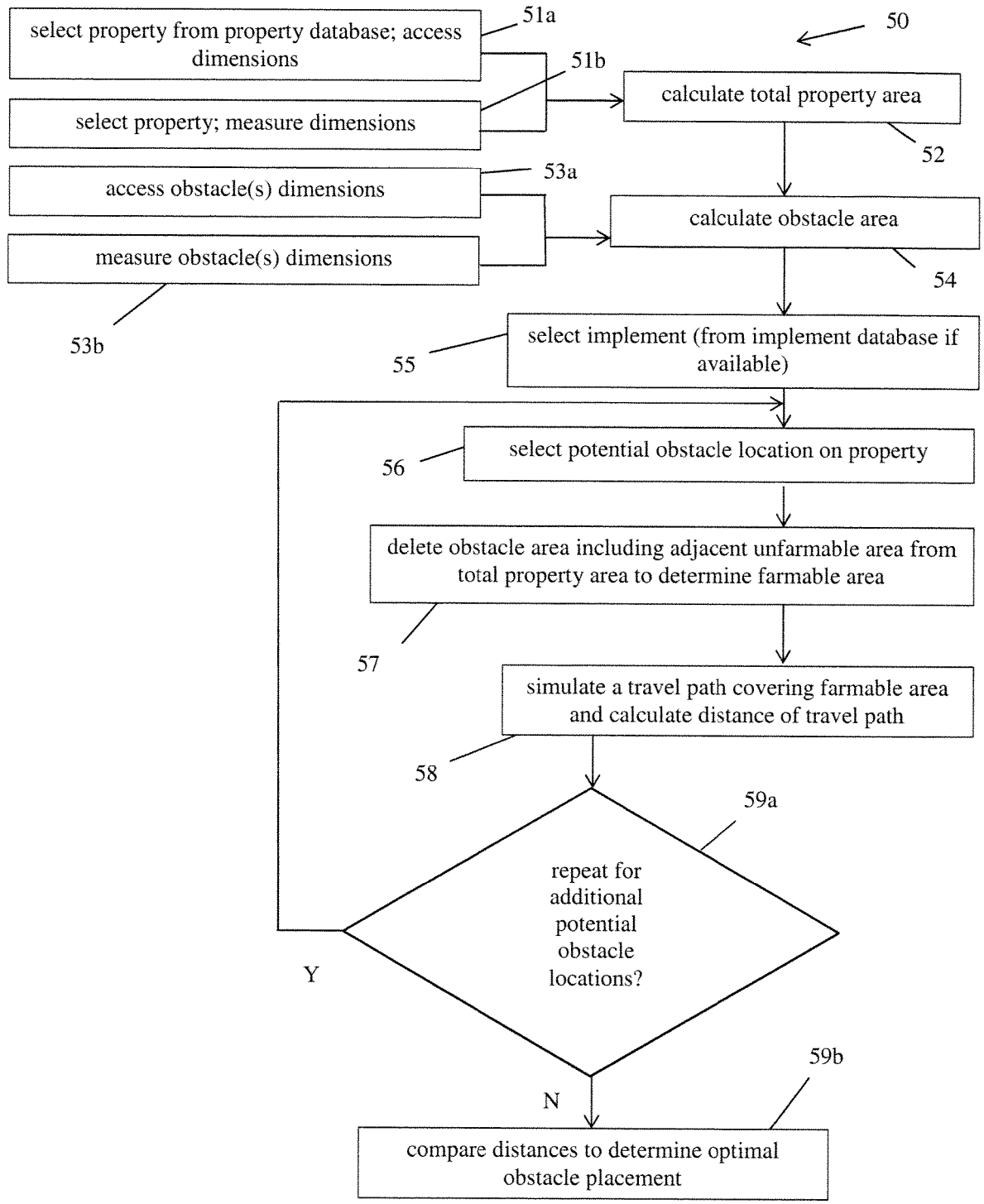
FIG. 5 is a flowchart illustrating a fourth method in accordance with the present invention.

Turning now to FIG. 5, a method 50 in accordance with the present invention begins with calculation of a total property area and an obstacle area in a manner akin to the description above, at steps 51a through 54. However, in this case only the dimensions of the obstacle are determined, not the location. An implement is then selected at step 55 in a manner described above.

At step 56, a potential location for the obstacle on the property is selected, and the obstacle area (including any adjacent unfarmable areas due to the nature of the obstacle and its proposed placement on the property) is deleted at step 57 from the total property area to arrive at a farmable area for simulation activities. A travel path is then simulated at step 58 that covers as much of the farmable land as possible given the obstacle placement and implement type, and a travel distance can then be calculated.

At step 59a, a decision is made regarding whether other obstacle locations should be tested, and the simulation activity can be repeated as desired. Travel distances for each simulation can be compared at step 59b, with a shortest travel distance being identified with the optimal obstacle placement. It is understood and acknowledged that other factors may require consideration when determining an obstacle placement, but reduced implement travel distance can provide one way to mitigate the potential negative impact on agricultural production from a target field.

As stated above, optimization based on shortest distance or reduced time is one possible factor to use in comparison alternative possible travel paths. Various other parameters or factors could be selected instead, or in addition to distance/time, and the skilled person will not be able to see how such parameters or factors could be used when selecting between alternative paths. Further, advances in robotics and autonomous vehicles (including agricultural implements) will provide another example of the utility of the present invention, where, for example, a method and system according to the present invention determines and outputs an optimized travel plan and communicates it to the vehicle for implementation.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. A computer implemented method for controlling an agricultural implement in an agricultural field, the method comprising:
   identifying dimensions of an external boundary of the agricultural field, the external boundary of the agricultural field defining an agricultural field area;
   calculating dimensions of a boundary extent of an obstacle within the external boundary of the agricultural field and a location of the obstacle in the agricultural field, the boundary extent of the obstacle defining an obstacle area;
   determining a total area of the agricultural field outside the boundary extent of the obstacle that is available for an agricultural activity by subtracting the obstacle area from the agricultural field area;

selecting an agricultural implement suitable for the agricultural activity, the agricultural implement having operating parameters;

determining potential travel paths for the agricultural implement to traverse the entirety of the total area under the operating parameters;

selecting an optimized travel path of the potential travel paths based on one or more predetermined factors;

outputting instructions for controlling the agricultural implement based on the optimized travel path; and automatically controlling the agricultural implement using the instructions.

2. The method of claim 1, wherein the step of identifying dimensions of the external boundary of the agricultural field comprises accessing a record of pre-measured dimensions for the agricultural field.

3. The method of claim 1, wherein the step of calculating dimensions of the boundary extent of the obstacle comprises accessing a record of pre-measured dimensions for the agricultural field.

4. The method of claim 1, wherein the step of determining the potential travel paths includes simulating each potential travel path.

5. The method of claim 1, wherein the operating parameters of the agricultural implement include a travel path width for the agricultural implement.

6. The method of claim 5, wherein the operating parameters of the agricultural implement include an anticipated overlap for adjacent rows of a potential travel path.

7. The method of claim 1, wherein each path of the potential travel paths comprises a distance, and the one or more predetermined factors are based on the distance.

8. The method of claim 1, wherein the one or more predetermined factors include a travel time.

9. The method of claim 1, wherein the one or more predetermined factors include a crop input.

10. The method of claim 1, wherein the instructions are electronic instructions suitable for use in a navigational system for the agricultural implement.

11. A computer implemented method for controlling an agricultural implement in an agricultural field, the method comprising:
identifying dimensions of an external boundary of the agricultural field, the external boundary of the agricultural field defining an agricultural field area;
calculating dimensions of a boundary extent of an obstacle within the external boundary of the agricultural field and a location of the obstacle in the agricultural field, the boundary extent of the obstacle defining an obstacle area;
determining a total area of the agricultural field outside the boundary extent of the obstacle that is available for an agricultural activity by subtracting the obstacle area from the agricultural field area;
selecting an agricultural implement suitable for the agricultural activity, the agricultural implement having operating parameters;
determining potential travel paths for the agricultural implement to traverse the entirety of the total area under the operating parameters;
selecting an optimized travel path of the potential travel paths based on one or more predetermined factors;
generating a travel plan for the optimized travel path; and
automatically controlling the agricultural implement using the travel plan.

12. The method of claim 11, wherein the travel plan comprises at least one of a map and instructions for controlling the agricultural implement.

13. The method of claim 12, wherein the instructions are electronic instructions suitable for use in a navigational system for the agricultural implement.

14. The method of claim 11, wherein the step of determining potential travel paths comprises:
determining a first travel path for the agricultural implement to traverse the entirety of the total area under the operating parameters; and
determining at least one second travel path for the agricultural implement to traverse the entirety of the total area under the operating parameters.

15. The method of claim 11, wherein: selecting the agricultural implement comprises selecting a first agricultural implement having first operating parameters and a second agricultural implement having second operating parameters, and determining potential travel paths comprises: determining first potential travel paths for the first agricultural implement to traverse the entirety of the total area under the first operating parameters; and determining second potential travel paths for the second agricultural implement to traverse the entirety of the total area under the second operating parameters.

16. The method of claim 11, wherein the step of selecting the optimized travel path comprises:
selecting a first optimized travel path of the first potential travel paths based on one or more predetermined factors;
selecting a second optimized travel path of the second potential travel paths based on the one or more predetermined factors; and
selecting one of the first agricultural implement or the second agricultural implement based on a comparison of the first optimized travel path and the second optimized travel path.

17. A computer implemented method for controlling an agricultural implement in an agricultural field, the method comprising:
identifying dimensions of an external boundary of the agricultural field, the external boundary of the agricultural field defining an agricultural field area;
calculating dimensions of a boundary extent of an obstacle within the external boundary of the agricultural field and a location of the obstacle in the agricultural field, the boundary extent of the obstacle defining an obstacle area;
determining a total area of the agricultural field outside the boundary extent of the obstacle that is available for an agricultural activity by subtracting the obstacle area from the agricultural field area;
selecting an agricultural implement suitable for the agricultural activity on the agricultural field, the agricultural implement having operating parameters;
determining at least two potential travel paths for the agricultural implement to traverse the entirety of the total area under the operating parameters;
generating a comparison of the at least two potential travel paths based on one or more predetermined factors; and
automatically controlling the agricultural implement using the comparison.

18. The method of claim 17, further comprising determining an impact of the obstacle on the agricultural activity based on the comparison of the at least two travel paths.

19. The method of claim 17, wherein the determining the impact comprises:
- defining a pre-disturbance area based on the dimensions of the agricultural field;
- determining a first travel path for the agricultural implement to traverse the pre-disturbance area under the operating parameters;
- defining a disturbance area based on the obstacle area and the location of the obstacle in the agricultural field;
- determining a second travel path for the agricultural implement to traverse the post-disturbance area under the operating parameters; and
- comparing the first and second possible travel paths.

20. The method of claim 17, further comprising:
- selecting a crop; and
- determining the agricultural activity based on the selected crop.

* * * * *